Patented Apr. 3, 1951  2,547,701

UNITED STATES PATENT OFFICE 2,547,701

SOLUBLE FUSIBLE UNSATURATED HALO-
GEN-CONTAINING RESINS MADE BY
POLYMERIZATION OF DI - 2 - ALKENYL
ESTER OF AN ALPHA-ETHYLENIC DICAR-
BOXYLIC ACID IN THE PRESENCE OF A
BROMOMETHANE COMPOUND TYPIFIED
BY BROMOTRICHLOROMETHANE

Robert A. Gregg, Passaic, N. J., assignor to United
States Rubber Company, New York, N. Y., a
corporation of New Jersey No Drawing. Application July 17, 1947,
Serial No. 761,741

10 Claims. (Cl. 260—78.4)

My invention relates to the preparation of a novel class of soluble, unsaturated, halogen-containing resins derived from the esters of allyl and 2-alkylallyl alcohols with α-unsaturated dicarboxylic acids, which esters are hereinafter designated as di-2-alkenyl esters. The new polymers of the present invention can be converted to an insoluble and substantially infusible state by further polymerization, as well as by copolymerization with reactive ethylenic compounds, to yield a variety of molded, coated, laminated and impregnated articles of improved flame-resistance.

The present invention is based on the discovery that polymerization of monomeric di-2-alkenyl esters of the α-unsaturated dicarboxylic acids in the presence of selected bromomethane compounds effects a marked modification of the resulting resin, the bromomethane compound participating in a reaction with the di-2-alkenyl ester undergoing polymerization to an extensive degree and thereby effecting introduction into the polymerized reaction product of a considerable proportion of combined halogen which renders the product flame-resistant and in many cases self-extinguishing. Moreover by this method the premature gelation of the polymerizing di-2-alkenyl ester encountered by the art is suppressed to such a marked extent that the major proportion of the monomeric di-2-alkenyl ester can be readily converted to the soluble polymeric form.

The resins of my invention are prepared by polymerizing a di-2-alkenyl ester of an α-unsaturated dicarboxylic acid, which di-2-alkenyl ester is preferably selected from the class consisting of diallyl and di-2-alkylallyl, e. g., dimethallyl, esters of maleic, fumaric, itaconic, citraconic and mesaconic acids in the presence of a bromomethane compound having the general formula $BrCX_3$ where the X's are selected from the group consisting of hydrogen, bromine and chlorine, at least two of the X's being halogen. The resulting soluble, unsaturated resins are secured in high yields and contain very appreciable amounts of halogen. This is surprising since halogenated compounds devoid of unsaturation, e g., carbon tetrachloride, have heretofore been regarded by the art as inert solvents for the polymerization of di-2-alkenyl esters. My invention is based on the discovery that if the halogenated compound contains at least one bromine atom and otherwise responds to the general formula given above, its reactivity in the presence of polymerizing di-2-alkenyl esters is remarkably and unexpectedly enhanced.

The bromomethane compounds having the general formula given above are as follows:

| | |
|---|---|
| Carbon tetrabromide | $CBr_4$ |
| Tribromochloromethane | $CBr_3Cl$ |
| Dibromodichloromethane | $CBr_2Cl_2$ |
| Bromotrichloromethane | $CBrCl_3$ |
| Bromoform | $CHBr_3$ |
| Dibromochloromethane | $CHBr_2Cl$ |
| Bromodichloromethane | $CHBrCl_2$ |

Of the bromomethane compounds, bromotrichloromethane and carbon tetrabromide are especially effective in the practice of the present invention. However, if desired, any of the other enumerated bromomethane compounds may be employed.

As used herein the term "di-2-alkenyl esters" includes the esters of α-unsaturated dicarboxylic acids with 2-propenyl alcohols, and comprehends the diallyl esters, the di-2-alkylallyl esters, and mixed allyl 2-alkylallyl esters, for example, an ester wherein one carboxylic acid group is esterified with allyl alcohol and the other with methallyl alcohol. The principal 2-alkylallyl alcohol is methallyl alcohol, although substitution with higher alkyl groups such as ethyl, propyl, butyl, etc. in the 2-position on the allyl group is within the broad purview of my invention. Examples of di-2-alkenyl esters to which the present invention may be applied are diallyl maleate, diallyl fumarate, dimethallyl maleate, dimethallyl fumarate, diallyl itaconate, diallyl citraconate, and the like.

Copolymerizable monoethylenic compounds such as styrene, methyl acrylate, methyl methacrylate and acrylonitrile may be present in the mixture undergoing polymerization in order to secure desirable variations in the properties of the polymeric products.

As noted in the prior art, the disadvantageously premature gelation of a polymerizing di-2-alkenyl ester can be postponed to some extent by carrying out the reaction in the presence of an inert solvent such as carbon tetrachloride, but the volume of solvent required is prohibitively large for economical operation and the amount of halogen introduced into the resulting polymer is insignificant. In my invention, to the contrary, the polymerization of the di-2-alkenyl ester in the presence of as little as approximately 5% of its weight of a bromomethane compound from the class defined above effects a very significant increase in the amount of monomeric ester converted to the desired soluble, polymeric form and likewise introduces an appreciable amount of halogen into the polymer.

For example, the polymerization of diallyl fumarate in the presence of 5% of its weight of bromotrichloromethane yields a soluble polymer containing over 9% of combined halogen, whereas the polymerization of diallyl fumarate in the presence of 500% of its weight of carbon tetrachloride yields a polymer containing less than 2% of halogen. As the amount of the bromomethane compound in the reactant mixture is increased, both the yield and the halogen content of the resulting soluble polymers are likewise increased whereby the major proportion of the monomeric di-2-alkenyl ester can be readily converted to the polymeric form without any danger of gelation. While optimum yields of soluble polymers may be secured from reactant mixtures containing as much as 250% of the bromomethane compound based on the di-2-alkenyl ester, I have found that the reactant mixtures need not contain in substantial excess of 200% of the bromomethane compound for most applications. Indeed for reasons of economy and efficiency I ordinarily prefer to employ from 35 to 100% by weight of the bromomethane compound since the polymers produced from reactant mixtures containing such amounts possess the requisite flame-resistance.

All of the polymers of the present invention are completely self-extinguishing by ASTM test D—638—44 when they contain in excess of approximately 25% by weight of combined halogen. For example the polymerization of diallyl fumarate in the presence of as little as approximately 35% by weight of bromotrichloromethane yields a flame-proof resin, whereas the polymerization of diallyl fumarate in the presence of as much as 500% by weight of the carbon tetrachloride disclosed by the prior art yields a readily combustible polymer.

It will be seen that the amount of the selected bromomethane compound employed in practicing the present invention may range from 5 to 250% by weight based on the total weight of unsaturated, polymerizable monomers, and preferably ranges from 35 to 100%.

The percentage of combined halogen in resins made in accordance with the present invention may vary widely, depending upon many factors, but will ordinarily range from 5 to 50% and is preferably in excess of 25% by weight.

The proportion of copolymerizable monoethylenic material which may be incorporated with the monomeric di-2-alkenyl ester and the bromomethane compound in formulating the original reaction mixture may vary widely. Generally the weight of copolymerizable monoethylenic material employed will range from 10 to 100% of the weight of the monomeric di-2-alkenyl ester.

My new polymers may be prepared by heating a mixture of the di-2-alkenyl ester and the bromomethane compound, with or without the addition of another copolymerizable unsaturated monomer, at temperatures ranging from 25° to 100° C. and preferably in the neighborhood of 60° C., say from 55° to 65° C. The polymerization reaction is promoted by known polymerization catalysts of which the peroxidic compounds such as diacetyl peroxide, acetyl benzoyl peroxide and dibenzoyl peroxide are preferred. The peroxidic catalysts may be employed in concentrations of from approximately 0.1 to 3.0% by weight of the reactant mixture. It is preferable to conduct the polymerization in an inert atmosphere, e. g. nitrogen, to ensure the formation of clear, water-white products.

The time required for the polymerization may vary widely depending upon many factors including the specific di-2-alkenyl ester which is employed, the temperature, the type and amount of polymerization catalyst, the type and amount of any other monomeric copolymerizable material present. Ordinarily a reaction time ranging from 3 to 25 hours will be employed. The course of the polymerization may be readily followed by observing the increase in the viscosity or in the refractive index of the reaction mixture, and when the reaction has proceeded to the desired extent it may be halted by cooling.

Since the polymerization is exothermic, industrial-scale preparations require only moderate heating. I have found that control of the reaction may be assured by gradual addition of the bromomethane compound to the polymerizing reaction mixture with vigorous agitation thereof. The addition of the bromomethane compound may be either continuous or intermittent, the former being preferred. If desired the polymerization catalyst, or at least a portion thereof, may be added in admixture with the bromomethane compound.

Since the viscous syrup-like reaction mixtures of my invention contain no insoluble gel, inhibitors, etc., such as are commonly encountered in prior art polymerizations, they can be employed directly and without prior art modifications in a wide variety of commercial applications. Alternatively the resins can be obtained in the solid form by precipitation thereof from the reaction mixture by means of a non-solvent, e. g., n-hexane. My resins can be used alone or in conjunction with suitable dyes, fillers, plasticizers, solvents, and copolymerizable ethylenic compounds, e. g., esters of the acrylic, maleic, vinyl and allyl types. Upon heating compositions containing my polymers to elevated temperatures and preferably with polymerization catalysts, e. g., peroxides, they are converted to a solvent- and heat-resistant form ranging in character from flame-retardant to completely non-flammable in proportion to their halogen content as described above.

Where the soluble, fusible resin of my invention is admixed with a reactive monomeric ethylenic compound copolymerizable therewith and the resulting mixture is polymerized to the insoluble, substantially infusible stage, the proportion of copolymerizable ethylenic material may vary widely, depending upon the properties desired in the final product, but preferably it is such that the proportion of combined halogen in the final cured resin is still sufficient to render it flame-resistant, the ranges for halogen content of the fusible resin given above applying equally to the final insoluble, infusible resin.

In some cases the fusible, soluble polymerization reaction product resulting from the initial polymerization of the di-2-alkenyl ester in the presence of the bromomethane compound may be employed directly in that form where it is desired to take advantage of its fusible, soluble nature and its flame-resistant properties. For example, it may be employed where its thermoplastic or soluble properties are advantageous. Thus it may be admixed with a suitable solvent to give a coating or impregnating composition. In any event, however, it is generally preferred to convert it ultimately to the insoluble, substantially infusible stage.

The following examples disclose my invention in more detail; all parts being by weight.

EXAMPLE 1

(a) A mixture of 399 parts of diallyl maleate and 2.0 parts of benzoyl peroxide is heated at 60° C. with vigorous stirring under an atmosphere of nitrogen. Fifty parts of a mixture comprising 266 parts of bromotrichloromethane and 2 parts of benzoyl peroxide are added initially and the remainder of the said mixture is gradually introduced over the course of 3.2 hours. The reaction temperature is maintained at 60° C. for an additional 3.5 hours and is then lowered to 25° C. The reaction product is a clear, colorless, viscous syrup having a viscosity of approximately 44 seconds at 25° C. on the Gardner-Holdt scale.

(b) A small aliquot of the product is withdrawn and further refined by repeated solution in acetone and precipitation with n-hexane. This procedure yields a solid polymer of weight corresponding to 374 parts from the entire reaction mixture, and partial evaporation of the liquid medium (i. e., the acetone-hexane mixtures) yields a further quantity of low-molecular weight polymers in the form of viscous oils.

(c) Seventeen parts of the reaction product from (a) above are admixed with 0.17 part of benzoyl peroxide and poured into a cylindrical mold. After heating for somewhat less than 2 hours at 60° C. and 1 hour at 90° C. a hard, clear, acetone-insoluble and non-flammable casting is obtained which has undergone comparatively little shrinkage during the curing process. Prior art attempts to secure castings by curing solutions of the di-2-alkenyl esters in inert solvents such as carbon tetrachloride yield only fractured, shrunken and combustible masses which are frequently cloudy or opaque and characterized by bubbles and blow holes, all resulting from the expression and/or volatilization of the unreactive solvent.

(d) A strip of "printed" cotton fabric is impregnated with a solution of 0.1 part of benzoyl peroxide in 10 parts of the reaction product from (a) and heated between steel plates for approximately 2 hours at 60° C. and then for 10 minutes at 100° C. The resultant tough, lightweight sheet is unattacked by acetone, and faithfully transmits the color and design of the cloth "core."

(e) Two plies of glass-cloth are bonded together by impregnating with 10 parts of the resin from (a) and 0.1 part of benzoyl peroxide and heating in a plate mold for 5 minutes at 100° C. and 5 minutes at 130° C. The resulting clear, bubble-free laminate is tough, somewhat flexible, abrasion-resistant and unattacked by acetone. It is self-extinguishing by ASTM test D—638—44.

(f) A mixture of 9 parts of the resin from (a), 1.5 parts of diethyl fumarate and 0.05 part of benzoyl peroxide is heated at 90° C. for 0.3 hour in a cylindrical mold to yield a clear, hard casting which is insoluble in common organic solvents such as acetone. Diethyl maleate can be employed in place of diethyl fumarate above with similar results. Acrylonitrile can likewise serve as a copolymerizable monomer for my resins although the resulting castings possess a distinct color ranging from pale yellow to light amber.

EXAMPLE 2

This example illustrates the effect of varying concentrations of a bromohalomethane upon the polymerization of a di-2-alkenyl ester of an α-unsaturated dicarboxylic acid.

Mixtures of bromotrichloromethane with diallyl fumarate and with dimethallyl fumarate in various proportions are heated at 60° C. together with benzoyl peroxide as catalyst until the point of incipient gelation is attained in each case. The reaction mixtures are then cooled and purified for analysis by solution in acetone and precipitation with n-hexane. After drying in vacuo to constant weight the amounts of the polymeric products are determined.

The pertinent details are summarized below in Table I. For the sole purpose of emphasizing the advantages of my invention I have likewise included the polymerization of di-2-alkenyl esters according to prior art methods—both in the presence and absence of chlorinated methanes (runs $a, c, l, m$).

Table I

| | Dimethallyl Fumarate | Diallyl Fumarate | Bromotrichloromethane | Benzoyl Peroxide | Reaction Time (hours) | Polymeric Product | Analysis | | Di-2-alkenyl Ester Converted to Soluble Polymer |
|---|---|---|---|---|---|---|---|---|---|
| | | | | | | | Halogen | Iodine No. | |
| | | | | | | | Per cent | | Per cent |
| a | 100 | | | 1.1 | 11.5 | 10.0 | | | 10.0 |
| b | 100 | | 100.0 | 2.0 | 22.0 | 35.0 | 46.6 | | 17.5 |
| c | | 100 | | 1.0 | 4.25 | 9.0 | | | 9.0 |
| d | | 100 | 5.0 | 1.05 | 4.8 | 39.4 | 9.20 | 146 | 35.5 |
| e | | 100 | 12.5 | 1.15 | 4.6 | 47.2 | 15.20 | 137 | 39.6 |
| f | | 100 | 25.0 | 1.25 | 4.2 | 54.8 | 23.20 | 117 | 41.1 |
| g | | 100 | 33.4 | 1.17 | 5.1 | 74.8 | | | |
| h | | 100 | 60.0 | 1.60 | 5.2 | 104.0 | | | |
| i | | 100 | 100.0 | 2.50 | 6.2 | 115.4 | 40.8 | | 65.0 |
| j | | 100 | 120.0 | 2.20 | 5.3 | 128.0 | | | |
| k | | 100 | 200.0 | 3.00 | 5.0 | 185.0 | | | |
| l | | 100 | (¹) | 5.00 | 7.5 | 51.0 | 1.16 | | 50.4 |
| m | | 100 | (²) | 5.00 | 14.0 | 60.0 | 1.83 | | 58.8 |

¹ 250 parts of $CCl_4$.
² 500 parts of $CCl_4$.

A comparison of run $c$ with run $d$ demonstrates the marked increase in the amount of monomeric di-2-alkenyl ester converted to the soluble polymeric form by the use of even small amounts of the bromotrichloromethane of my invention. From a comparison of run $i$ with run $m$ it is apparent that not only is the method of my invention markedly superior to prior art processes in securing a yield of soluble polymer, but that the bromohalomethanes which I employ are incomparably more effective in endowing the resultant polymers with sufficient halogen to achieve optimum flame resistance.

EXAMPLE 3

Illustrative of other di-2-alkenyl esters which are operable in my invention are diallyl esters of citraconic and itaconic acids. Like diallyl fumarate these esters react with bromohalomethanes to yield soluble, convertible polymers as indicated below in Table II. Runs *a* and *d* are included merely to illustrate the polymerization of these esters in the absence of the bromohalomethanes of my invention. The reactions are carried out in the manner of Example 2 above.

Table II

| | Diallyl Itaconate | Diallyl Citraconate | Bromotrichloromethane | Benzoyl Peroxide | Reaction Time | Polymeric Product |
|---|---|---|---|---|---|---|
| | | | | | Hours | |
| a | 100 | | | 0.21 | 2.2 | 13.9 |
| b | 100 | | 50 | 2.0 | 29.5 | 64.5 |
| c | 100 | | 100 | 2.0 | 40.0 | 86.0 |
| d | | 100 | | 0.45 | 64.1 | 18.4 |
| e | | 100 | 50 | 0.2 | 22.5 | 92.5 |
| f | | 100 | 100 | 0.2 | 26.5 | 110.0 |

Upon heating the soluble polymeric products of runs *b*, *c*, *e* and *f* at 60° C. with 1% by weight of benzoyl peroxide, they are converted to insoluble gels which harden to rigid bodies upon further heating, e. g., 1–3 hours at 90–110° C. Incorporation of 20–70% by weight of monomeric diallyl fumarate with the polymers prior to the curing step yields products of increased hardness.

EXAMPLE 4

Carbon tetrabromide, dibromo-dichloromethane and monobromo-dichloromethane are exemplary of other bromomethane compounds which are operable in my invention, reacting with the polymerizing di-2-alkenyl esters to yield soluble, halogenated resins. In Table III below, the polymerization of diallyl fumarate according to my invention (runs *b*, *d* and *e*) is compared with prior art methods (runs *a* and *c*)—all reactions being carried out as in Example 2.

Table III

| | Diallyl Fumarate | The Bromo methane Compound Used | Benzoyl Peroxide | Reaction Time | Polymeric Product | Analysis Per Cent Halogen | Diallyl Fumarate Converted to Soluble Polymer |
|---|---|---|---|---|---|---|---|
| | | | | Hours | | | Per Cent |
| a | 100 | | 1.00 | 4.25 | 9.0 | | 9.0 |
| b | 100 | 33.3(CBr₄) | 1.33 | 5.0 | ²99.5 | 31.84 | 67.0 |
| c | 100 | (¹) | 5.00 | 14.0 | 60.0 | 1.83 | 58.8 |
| d | 100 | 100 (CBr₂Cl₂) | 2.0 | 5.0 | 35.2 | 45.70 | 18.3 |
| e | 100 | 100 (CHBrCl₂) | 2.0 | 9.5 | 37.6 | 11.10 | 32.9 |

¹ 500 parts of CCl⁴.
² This product had an iodine number of 54.3.

From Table III it is evident that the introduction of carbon tetrabromide into the polymerizing diallyl fumarate effects a very marked increase in the amount of the monomeric ester which is converted to the soluble polymeric form. It is likewise apparent that this improvement in yield is far superior to that secured by carrying out the polymerization in the presence of carbon tetrachloride and moreover the amount of halogen introduced into the polymer by my method is far greater on a molar as well as a weight basis; the latter is true also with the other bromomethanes (runs *d* and *e*).

EXAMPLE 5

The method of my invention can likewise be applied to the preparation of soluble convertible copolymers of the di-2-alkenyl esters and polymerizable monoethylenic compounds as illustrated in Table IV which summarizes the copolymerizations of various mixtures of diallyl fumarate and acrylonitrile in the presence of bromotrichloromethane.

Table IV

| | Diallyl Fumarate | Acrylonitrile | Bromotrichloromethane | Benzoyl Peroxide | Reaction Time | Polymeric Product | Analysis | | |
|---|---|---|---|---|---|---|---|---|---|
| | | | | | | | Halogen | Nitrogen | Iodine No. |
| | | | | | Hours | | Per Cent | Per Cent | |
| a | 100 | 10.0 | 50.0 | 1.60 | 45.9 | 106.0 | 29.9 | 1.93 | 90.8 |
| b | 100 | 10.0 | 70.0 | 1.80 | 45.9 | 118.0 | 34.2 | 2.08 | 74.4 |
| c | 100 | 10.0 | 100.0 | 2.10 | 38.5 | 131.0 | 39.1 | 1.54 | 46.4 |
| d | 100 | 30.0 | 100.0 | 2.30 | 45.9 | 152.0 | 33.3 | 4.53 | 71.6 |

Other copolymerizable monoolefinic compounds can partly or completely replace the acrylonitrile employed above. For example, a mixture of 40 parts of diallyl fumarate, 18 parts of styrene, 60 parts of bromotrichloromethane and 1.18 parts of benzoyl peroxide is heated for approximately 19 hours at 60° C. The viscous reaction product is then cooled to 25° C. and 5 parts thereof are admixed with 0.05 part of benzoyl peroxide and cured in a mold by heating at 60° C. for 5 hours and then at 90° C. for an additional 2 hours. The resulting flame-resistant casting is hard, clear and insoluble in benzene and acetone.

Any of the other bromomethanes disclosed above such as bromoform, dibromochloromethane, and tribromochloromethane may be used in Example 5.

From the foregoing, many advantages of my invention will be apparent to those skilled in the art. The principal advantage is that the invention provides a simple and economical method of reacting large proportions of selected halogenated methane derivatives with the di-2-alkenyl ester during polymerization thereof, whereby the resulting resin is flame-resistant or self-extinguishing. Another advantage is that the use of the bromomethane compounds used in accordance with the present invention substantially increases the amount of the monomeric di-2-alkenyl ester which is converted to the desirable soluble polymeric form. Another advantage is that the invention provides a unique polymerizable mixture which is capable upon polymerization of yielding a soluble, fusible, unsaturated, halogen-containing resin which in turn can by further polymerization be readily converted to an insoluble, substantially infusible resin. Many other advantages of the invention will be apparent to those skilled in the art.

Having thus described my invention, what I claim and desire to protect by Letters Patent is:

1. A method which comprises polymerizing a monomeric di-ester of an alcohol selected from the group consisting of allyl alcohol and 2-alkylallyl alcohols with an alpha-ethylenic dicarboxylic acid in the presence of from 5 to 250 per cent by weight based on the weight of said ester of a bromomethane compound of the general formula $BrCX_3$ where the X's are selected from the group consisting of hydrogen, bromine and chlorine, at least two of the X's being halogen, whereby a soluble fusible unsaturated halogen-containing resin is obtained by heating the mixture at a temperature of from 25° to 100° C. in the presence of a peroxidic polymerization catalyst.

2. A method which comprises polymerizing a monomeric di-ester of an alcohol selected from the group consisting of allyl alcohol and 2-alkylallyl alcohols with an alpha-ethylenic dicarboxylic acid by subjecting same to a temperature of from 25 to 100° C. in the presence of a peroxidic polymerization catalyst and during the polymerization adding gradually to the reaction mixture a bromomethane compound of the general formula $BrCX_3$ where the X's are selected from the group consisting of hydrogen, bromine and chlorine, at least two of the X's being halogen and thereby effecting control of the exothermic reaction and reaction of the added bromomethane compound with consequent introduction of halogen into the resulting polymer, the amount of said bromomethane compound employed being from 5 to 250 per cent by weight based on the weight of said ester, and continuing the reaction whereby a soluble fusible unsaturated halogen-containing resin is produced.

3. A soluble fusible unsaturated halogen-containing resin which is the polymerized reaction product of a monomeric di-ester of an alcohol selected from the group consisting of allyl alcohol and 2-alkylallyl alcohols with an alpha-ethylenic dicarboxylic acid and from 5 to 250 per cent by weight based on the weight of said ester of a bromomethane compound of the general formula $BrCX_3$ where the X's are selected from the group consisting of hydrogen, bromine and chlorine, at least two of the X's being halogen.

4. A soluble fusible unsaturated halogen-containing resin which is the polymerized reaction product of a monomeric di-ester of an alcohol selected from the group consisting of allyl alcohol and 2-alkylallyl alcohols with an alpha-ethylenic dicarboxylic acid and from 35 to 100 per cent by weight based on the weight of said ester of a bromomethane compound of the general formula $BrCX_3$ where the X's are selected from the group consisting of hydrogen, bromine and chlorine, at least two of the X's being halogen.

5. A flame-resistant insoluble, substantially infusible halogen-containing resin which is the polymerized reaction product of a monomeric di-ester of an alcohol selected from the group consisting of allyl alcohol and 2-alkylallyl alcohols with an alpha-ethylenic dicarboxylic acid and from 5 to 250 per cent by weight based on the weight of said ester of a bromomethane compound of the general formula $BrCX_3$ where the X's are selected from the group consisting of hydrogen, bromine and chlorine, at least two of the X's being halogen.

6. A resin comprising the polymerized reaction product of a monomeric di-ester of an alcohol selected from the group consisting of allyl alcohol and 2-alkylallyl alcohols with an alpha-ethylenic dicarboxylic acid and from 5 to 250 per cent by weight, based on the weight of said ester, of a bromomethane compound of the general formula $BrCX_3$ where the X's are selected from the group consisting of hydrogen, bromine and chlorine, at least two of the X's being halogen, said resin containing from 5 to 50 per cent by weight of combined halogen.

7. A resin comprising the polymerized reaction product of a monomeric di-ester of an alcohol selected from the group consisting of allyl alcohol and 2-alkylallyl alcohols with an alpha-ethylenic dicarboxylic acid and from 5 to 250 percent by weight, based on the weight of said ester, of a bromomethane compound of the general formula $BrCX_3$ where the X's are selected from the group consisting of hydrogen, bromine and chlorine, at least two of the X's being halogen, said resin containing in excess of 25 per cent by weight of combined halogen.

8. A soluble, fusible, unsaturated halogen-containing resin which is the polymerized reaction product of a monomeric di-ester of an alcohol selected from the group consisting of allyl alcohol and 2-alkylallyl alcohols with an alpha-ethylenic dicarboxylic acid and from 5 to 250 per cent by weight, based on the weight of said ester, of bromotrichloromethane.

9. A soluble, fusible, unsaturated halogen-containing resin which is the polymerized reaction product of diallyl maleate and from 5 to 250 per cent by weight, based on the weight of said diallyl maleate, of bromotrichloromethane.

10. A soluble, fusible, unsaturated halogen-containing resin which is the polymerized reaction product of diallyl fumarate and from 5 to 250 per cent by weight, based on the weight of said diallyl fumarate, of bromotrichloromethane

ROBERT A. GREGG.

REFERENCES CITED

The following references are of record in the file of this patent:

UNITED STATES PATENTS

| Number | Name | Date |
|---|---|---|
| 2,433,616 | Marple et al. | Dec. 30, 1947 |
| 2,436,256 | Hanford et al. | Feb. 17, 1948 |